(12) United States Patent
Ohga et al.

(10) Patent No.: US 8,428,779 B2
(45) Date of Patent: *Apr. 23, 2013

(54) ROBOT CONTROLLING DEVICE

(75) Inventors: Junichiro Ohga, Kanagawa-ken (JP); Junji Oaki, Kanagawa-ken (JP); Hideki Ogawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/397,741

(22) Filed: Feb. 16, 2012

(65) Prior Publication Data

US 2012/0150347 A1 Jun. 14, 2012

Related U.S. Application Data

(63) Continuation of application No. PCT/JP2009/066548, filed on Sep. 24, 2009.

(51) Int. Cl.
*G05B 19/18* (2006.01)
(52) U.S. Cl.
USPC ............... 700/253; 700/245; 700/250; 901/2; 901/9; 901/45; 318/568.22
(58) Field of Classification Search .................. 700/245, 700/250, 251, 253, 254, 260, 261, 262, 263; 901/2, 9, 14, 15, 19, 45; 318/568.11, 568.22
See application file for complete search history.

(56) References Cited

U.S. PATENT DOCUMENTS

| 5,341,459 A * | 8/1994 | Backes .......................... 700/260 |
| 8,155,790 B2 * | 4/2012 | Oga et al. ....................... 700/261 |
| 2002/0151988 A1 * | 10/2002 | Shiba et al. ..................... 700/13 |
| 2008/0154246 A1 * | 6/2008 | Nowlin et al. ..................... 606/1 |
| 2010/0286826 A1 * | 11/2010 | Tsusaka et al. ................. 700/254 |
| 2011/0060460 A1 | 3/2011 | Oga et al. |
| 2012/0022690 A1 * | 1/2012 | Ooga et al. ..................... 700/258 |

FOREIGN PATENT DOCUMENTS

| JP | 06-091568 | 4/1994 |
| JP | 10-151590 | 6/1998 |
| JP | 10-193290 | 7/1998 |

(Continued)

OTHER PUBLICATIONS

Ryogo et al., Attitude Control of Planar End-Effector and Estimation of Contact Point Using Parallel Mechanism, 2008, Electronics and Communications in Japan, vol. 91, No. 3.*
International Search Report for International Application No. PCT/JP2009/066548 mailed on Dec. 22, 2009.

(Continued)

*Primary Examiner* — Khoi Tran
*Assistant Examiner* — Spencer Patton
(74) *Attorney, Agent, or Firm* — Turocy & Watson, LLP

(57) ABSTRACT

A robot controlling device includes: a position error calculator calculating a position error between an endpoint position of a robot and a position commanded value for the endpoint position; an external force calculator calculating an external force applied to the endpoint position; a force commanded value generator generating a force commanded value for the endpoint position; a force error calculator calculating a force error between the external force and the force commanded value; a storage storing the compliance model for the endpoint position; a first correction amount calculator calculating a first correction amount for the position commanded value, according to the force error, using the compliance model; and a second correction amount calculator calculating a second correction amount for the position commanded value, on the basis of the first order lag compensation for the first correction amount. The position error calculator calculates the position error, using the second correction amount.

5 Claims, 8 Drawing Sheets

FOREIGN PATENT DOCUMENTS

| | | |
|---|---|---|
| JP | 2004-314255 | 11/2004 |
| JP | 2005-014192 | 1/2005 |
| JP | 2008-264910 | 11/2008 |
| WO | 2010/050119 A1 | 5/2010 |

OTHER PUBLICATIONS

International Preliminary Report on Patentability for International Application No. PCT/JP2009/066548 mailed on Apr. 19, 2012.

* cited by examiner

ROBOT CONTROLLING DEVICE

CROSS REFERENCE TO RELATED APPLICATIONS

This application is a continuation of International Application No. PCT/JP2009/066548, filed on Sep. 24, 2009, the entire contents of which is hereby incorporated by reference.

FIELD

Embodiments relate to a robot controlling device which performs force control of a robot.

BACKGROUND

There is force control which controls a position and a contact force in an operational coordinate system while an endpoint such as an endpoint part of an arm of a robot (hereinafter, simply referred to as "endpoint") is in contact with a target object. In the force control, it is important to estimate an external force applied to the endpoint and to flexibly correct motion responsive to the external force.

In order to quickly and securely follow a force and a moment in contact, an integral compensator is provided between the endpoint and the operation target object. Integral compensation is applied to an output from a compliance model, such as a spring-mass damper model (JP-A10-193290 (Kokai)).

However, for instance, in a case where an operation target object has not been accurately positioned and the endpoint does not contact at an assumed position, contact force is not generated. Accordingly, there is a possibility that the endpoint continues to operate. In contrast, there is a possibility that the endpoint contacts the operation target object before reaching a target position and thereby causes an excessive contact force. In general, force control is inferior in responsiveness to position control. The force control has a slower following speed to the target contact force. In order to improve operation efficiency, it is necessary to promptly find an error and immediately transition to a retry operation. It is difficult to improve responsiveness only by monitoring deviation from a target value.

DETAILED DESCRIPTION

Figure 1:
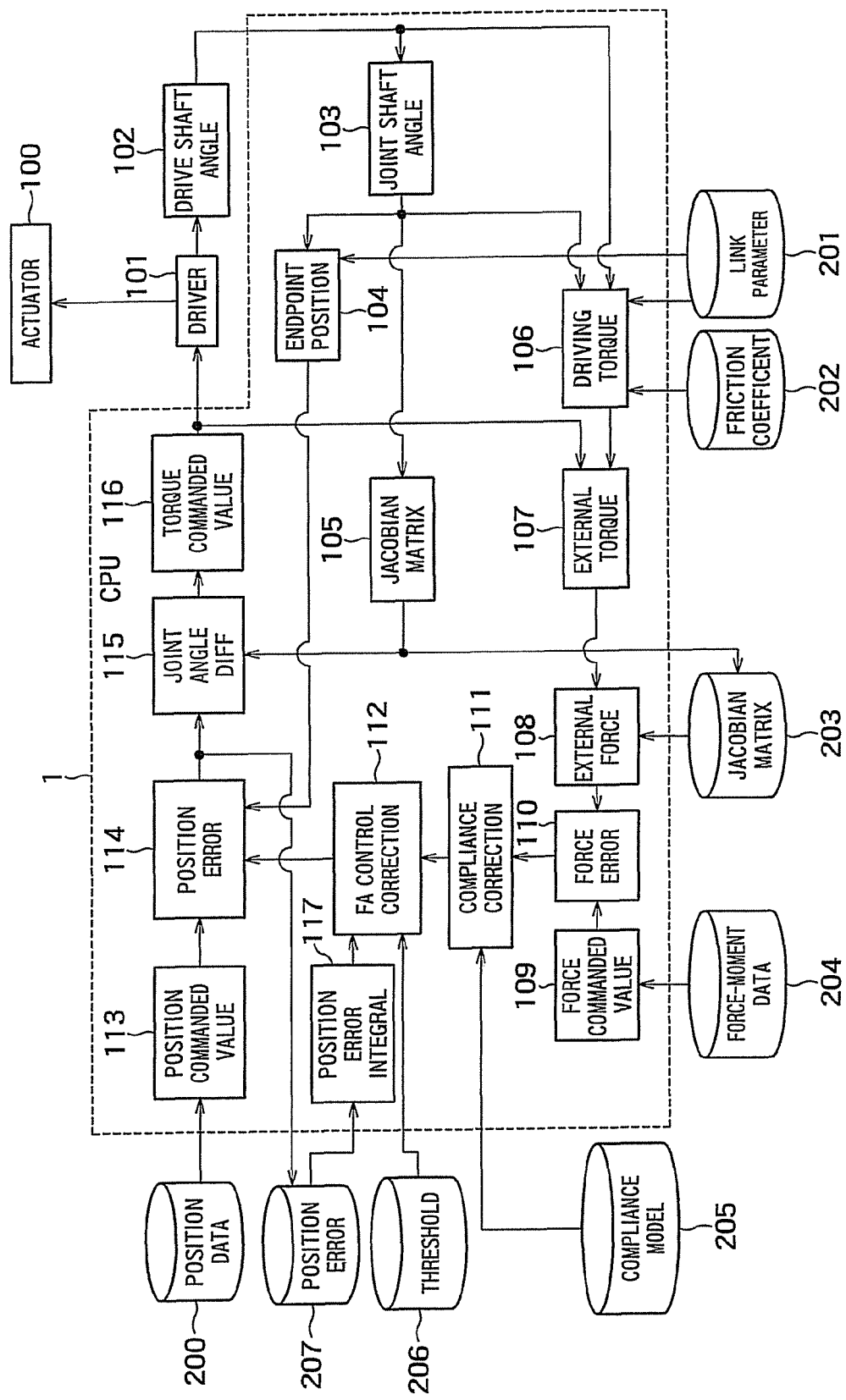
FIG. 1 is a robot controlling device according to an embodiment.

According to an embodiment, there is provided a robot controlling device, including: an actuator, a drive shaft angle detector, a joint shaft angle calculator, an endpoint position calculator, a position commanded value generator, a position error calculator, a Jacobian matrix calculator, a joint angle difference calculator, a torque commanded value calculator, a driver, a force commanded value generator, a force error calculator, a compliance model storage, a first correction amount calculator, and a second correction amount calculator.

The actuator drives a drive shaft transferring a driving force to a joint shaft.

The drive shaft angle detector detects an angle of the drive shaft.

The joint shaft angle calculator calculates an angle of the joint shaft from the angle of the drive shaft.

The endpoint position calculator calculates an endpoint position of a robot from the angle of the joint shaft.

The position commanded value generator generates a position commanded value for the endpoint position.

The position error calculator calculates a position error, which is an error between the endpoint position and the position commanded value.

The Jacobian matrix calculator calculates a Jacobian matrix between an operational coordinate system of the robot and a joint coordinate system, on the basis of the angle of the joint shaft.

The joint angle difference calculator calculates a joint angle difference, from the position error and the Jacobian matrix, according to an inverse kinematics calculation.

The torque commanded value calculator calculates a torque commanded value by integrating the joint angle difference.

The driver drives the actuator on the basis of the torque commanded value.

The external force calculator calculates an external force applied to the endpoint position.

The force commanded value generator generates a force commanded value for the endpoint position.

The force error calculator calculates a force error which is an error between the external force and the force commanded value.

The compliance model storage stores a compliance model for the endpoint position.

The first correction amount calculator calculates a first correction amount for the position commanded value, according to the force error, using the compliance model.

The second correction amount calculator calculates a second correction amount for the position commanded value, on the basis of a first order lag compensation for the first correction amount.

The position error calculator calculates the position error using the second correction amount.

Hereinafter, referring to diagrams, embodiments of the present invention will be described. In illustration in the diagrams, identical or analogous elements are assigned with identical symbols. However, the diagrams are schematic. Specific dimensions should be determined by a person skilled in the art in consideration of following description. It is a matter of course that the diagrams include parts where relationship of dimensions and ratios are different from each other.

The embodiments to be described below exemplify devices and methods for implementing the technical sprit of the present invention. The technical spirit does not particularly specify a material, shape, structure arrangement or the like of configurational components as those to be described below. The technical spirit can be variously modified in claims.

As shown in FIG. 1, a robot controlling device according to the embodiment includes a central processing unit (CPU) 1, an actuator 100, a driver (amplifier) 101, a drive shaft angle detector 102, a position data storage 200, a link parameter storage 201, a friction coefficient storage 202, a Jacobian matrix storage 203, a force-moment data storage 204, a compliance model storage 205, a force-accommodative control threshold storage 206 and a position error storage 207.

Figure 2:
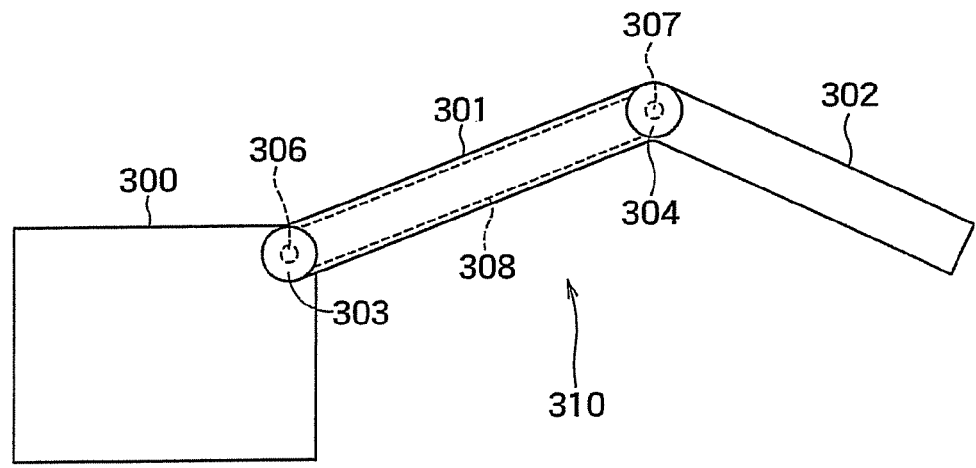
FIG. 2 is a schematic diagram showing a control target according to the embodiment.

FIG. 2 shows an example of a control target, which is a robot, in the embodiment. The robot includes a main body 300, and a movable element 310 provided at a main body 300. The movable element 310 includes a plurality of links 301 and 302, a plurality of joints 306 and 307 provided with a driving pulley 303 and a driven pulley 304, and a transfer mechanism 308 wound around the driving pulley 303 and the driven pulley 304.

Figure 3:
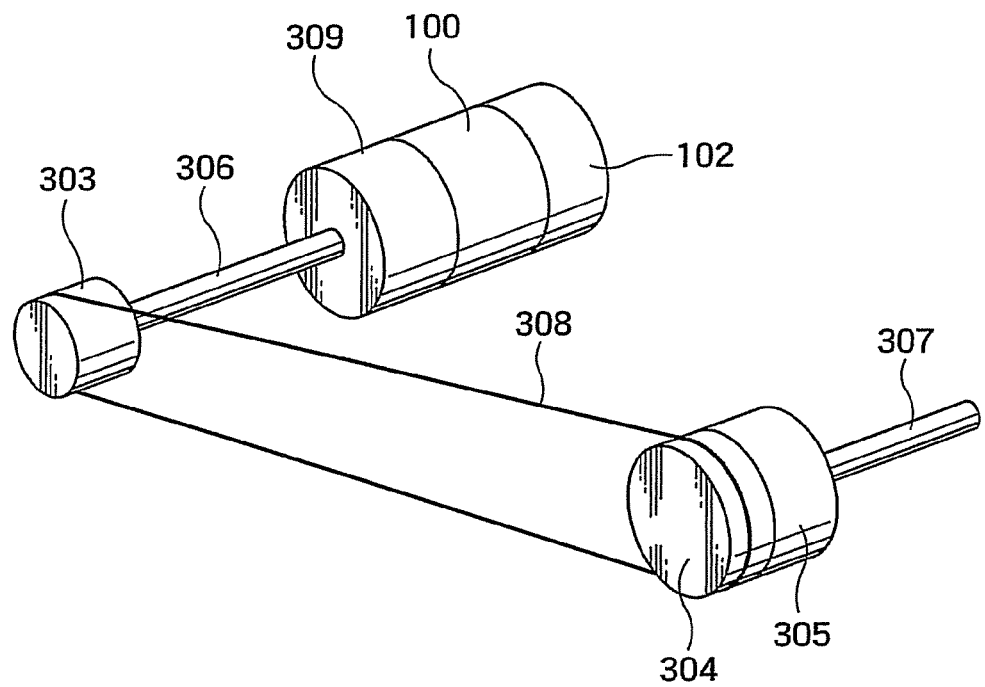
FIG. 3 is another schematic diagram showing a control target according to the embodiment.

As schematically shown in FIG. 3, the driving pulley 303, a speed reducer 309, the actuator 100 and the drive shaft angle detector 102 are attached to a drive shaft (joint) 306. The actuator performs rotational drive, and the speed reducer 309 reduces the number of revolutions (rotations) to increase the torque. Meanwhile, the driven pulley 304 and a joint shaft angle detector 305 are attached to the joint shaft (joint) 307. Turning of the drive shaft 306 turnably drives the joint shaft 307 via the driving pulley 303, the transfer mechanism 308 and the driven pulley 304. In the embodiment, a case of controlling the drive shaft 306 and the joint shaft 307 is described for the sake of simplicity.

As each of the drive shaft angle detector 102 and the joint shaft angle detector 305, a position sensor, such as an encoder can be used. The position sensor may include a filter for eliminating a predetermined frequency component. The drive shaft angle detector 102 detects an amount of displacement (drive shaft angle) of a position of the drive shaft 306. The joint shaft angle detector 305 detects an amount of displacement (joint shaft angle) of a position of the joint shaft 307. The joint shaft angle may be calculated from the drive shaft angle on the basis of a reduction ratio of the speed reducer 309 and a transfer ratio of the transfer mechanism 308.

The CPU 1 shown in FIG. 1 includes a joint shaft angle calculator 103, an endpoint position calculator 104, a Jacobian matrix calculator 105, a driving torque estimator 106, an external torque calculator 107, an external force calculator 108, a force commanded value generator 109, a force error calculator 110, a compliance correction amount calculator (first correction amount calculator) 111, a force-accommodative control correction amount calculator (second correction amount calculator) 112, a position commanded value generator 113, a position error calculator 114, a joint angle difference calculator 115, a torque commanded value calculator 116 and a position error integral calculator 117, as modules (logic circuits), which are hardware resources.

The joint shaft angle calculator 103 calculates a joint shaft angle, from the drive shaft angle calculated by the drive shaft angle detector 102, according to the ratio between the drive shaft 306 and the joint shaft 307 related to the transfer mechanism 308 such as the reduction ratio of the speed reducer 309. The joint shaft angle may directly be calculated by the joint shaft angle detector 305 (see FIG. 2) attached to the joint shaft 307.

The endpoint position calculator 104 reads link parameters from the link parameter storage 201. The endpoint position calculator 104 calculates an endpoint position in an operational coordinate system of the robot, from the joint shaft angle calculated by the joint shaft angle calculator 103, using link parameters, according to a forward kinematics calculation.

The Jacobian matrix calculator 105 calculates a Jacobian matrix from the joint shaft angle calculated by the joint shaft angle calculator 103, and stores this matrix in the Jacobian matrix storage 203. The Jacobian matrix is a matrix which represents infinitesimal displacement relationship between the operational coordinate system of the robot and a joint coordinate system. Provided that the Jacobian matrix is "J", a relationship of Expression (1) holds for an error "Δx" of the endpoint position and a joint angle difference "Δθ".

$$x = J\Delta\theta \qquad (1)$$

The driving torque estimator 106 estimates a driving torque required to drive the joint shaft 307 of the robot, from the drive shaft angle calculated by the drive shaft angle detector 102 and the joint shaft angle calculated by the joint shaft angle calculator 103.

Figure 4:
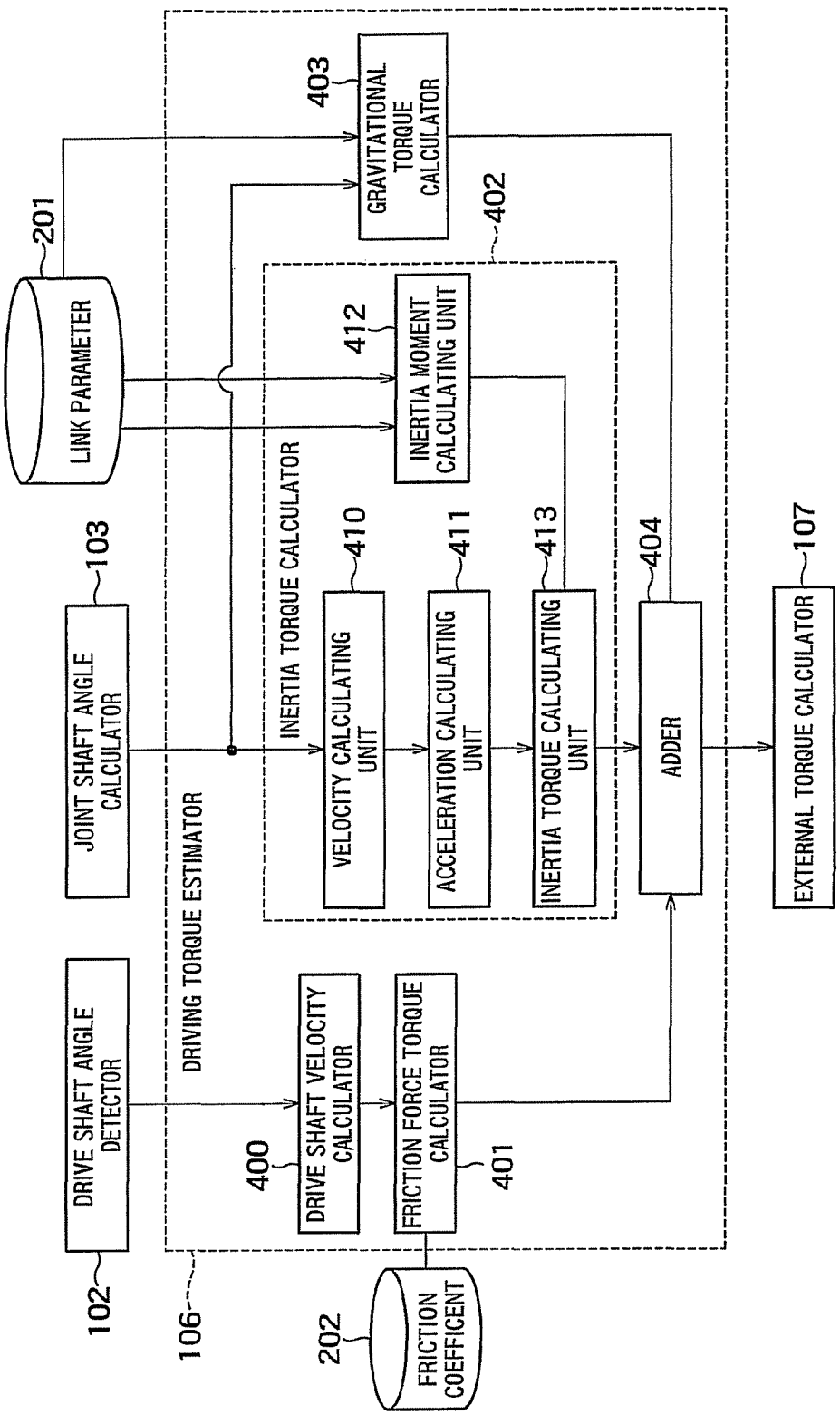
FIG. 4 is a block diagram showing a driving torque estimator according to the embodiment.

FIG. 4 shows an example of a configuration of the driving torque estimator 106.

The driving torque estimator 106 includes a drive shaft velocity calculator 400, a friction force torque calculator 401, an inertia torque calculator 402, a gravitational torque calculator 403 and an adder 404.

The drive shaft velocity calculator 400 calculates a drive shaft velocity from the drive shaft angle calculated by the drive shaft angle detector 102, for instance, by calculating a temporal difference thereof. The friction force torque calculator 401 reads a friction coefficient at the endpoint which has been stored in the friction coefficient storage 202. The friction force torque calculator 401 calculates a friction force torque from the drive shaft velocity calculated by the drive shaft velocity calculator 400 and a friction coefficient, where the friction force torque corresponds to coulomb friction, viscous friction and the like. The drive shaft angle detector 102 may detect the drive shaft velocity on the basis of a temporal difference of the joint shaft angles and the aforementioned reduction ratio and transfer ratio.

The inertia torque calculator 402 includes a velocity calculating unit 410, an acceleration calculating unit 411, an inertia moment calculating unit 412 and an inertia torque calculating unit 413. The velocity calculating unit 410 calculates a joint angle velocity from the joint shaft angle calculated by the joint shaft angle calculator 103. The acceleration calculating unit 411 calculates a joint angular acceleration from the joint angle velocity calculated by the velocity calculating unit 410. The inertia moment calculating unit 412 reads the link parameters from the link parameter storage 201. The inertia moment calculating unit 412 calculates inertia moments of the respective links 301 and 302 from the link parameters and the joint shaft angle calculated by the joint shaft angle calculator 103. The inertia torque calculating unit 413 calculates an inertia torque from the joint angular acceleration calculated by the acceleration calculating unit 411 and the inertia moment calculated by the inertia moment calculating unit 412.

The gravitational torque calculator 403 reads the link parameters from the link parameter storage 201. The gravitational torque calculator 403 calculates gravitational forces applied to the respective links 301 and 302, from the link parameters and the joint shaft angle calculated by the joint shaft angle calculator 103. The gravitational torque calculator 403 calculates a gravitational torque for compensating the gravitational forces applied to the links 301 and 302.

The adder 404 estimates a driving torque by adding the friction force torque calculated by the friction force torque calculator 401, the inertia torque calculated by the inertia torque calculating unit 413, and the gravitational torque calculated by the gravitational torque calculator 403 to one another.

The external torque calculator 107 shown in FIG. 1 calculates an external torque by calculating a difference between the driving torque estimated by the driving torque estimator 106 and the torque commanded value calculated by the torque commanded value calculator 116.

The external force calculator 108 calculates an external force in the operational coordinate system, from the external torque calculated by the external torque calculator 107, using the Jacobian matrix calculated by the Jacobian matrix calculator 105. According to the principle of virtual work, as represented in Expression (2), the external force "$f_d$" is calculated by multiplying the external torque $\tau_d$ by the inverse matrix of the transposed matrix "$J^T$" of the Jacobian matrix "J". The external force "$f_d$" in the Expression (2) is an external force assumed to be applied to the endpoint.

$$f_d = (J^T)^{-1} \tau_d \qquad (2)$$

The force commanded value generator 109 reads the target endpoint force-moment data (i.e. data of force and moment of the endpoint to be a target) stored in the force-moment data storage 204. The force commanded value generator 109 calculates an interpolated endpoint force commanded value at each control period, from the target endpoint force-moment data.

The force error calculator 110 calculates a force error "$\Delta f$", as represented by Expression (3), from an endpoint force commanded value "$f_R$", generated by the force commanded value generator 109 and an external force "$f_d$" calculated by the external force calculator 108.

$$\Delta f = f_R - f_d \qquad (3)$$

The compliance correction amount calculator (first correction amount calculator) 111 reads the compliance model from the compliance model storage 205. The compliance correction amount calculator 111 calculates a correction amount (first correction amount) of the endpoint position according to the force error calculated by the force error calculator 110, using the compliance model. Here, the compliance model virtually assumes inertia, viscosity and stiffness between the endpoint and a contact target, for instance, as represented by Expression (4).

$$M\Delta\ddot{x} + D\Delta\dot{x} + K\Delta x = K_f \Delta f \qquad (4)$$

where "$\Delta x$" is the error in the operational coordinate system, "$\Delta x$ dot" is a velocity in the operational coordinate system, "$\Delta x$ double dot" is an acceleration vector in the operational coordinate system, "M" is an inertia matrix, "D" is a viscosity coefficient matrix, "K" is a stiffness coefficient matrix, and "$K_f$" is a force feedback gain matrix. A compliance selection matrix for switching the axis in which the force and position are applied has a form including the force feedback gain matrix "$K_f$". The velocity vector "$\Delta x$ dot" and the acceleration vector "$\Delta x$ double dot" of the error can be approximated by first-order and second-order temporal differences of the position error vector "$\Delta x$", respectively. Therefore, a compliance correction amount $\Delta x_{comp}$ (first correction amount) of the endpoint position can be calculated as represented by Expression (5).

$$\Delta x_{comp} = 1/(K_f \Delta f - M \Delta \ddot{x} - D \Delta \dot{x}) \qquad (5)$$

The force-accommodative control correction amount calculator (second correction amount calculator) 112 calculates correction amount (second correction amount) for a commanded value for the endpoint position on the basis of a first order lag operation on the compliance correction amount "$\Delta x_{comp}$" (first correction amount).

Figure 5:
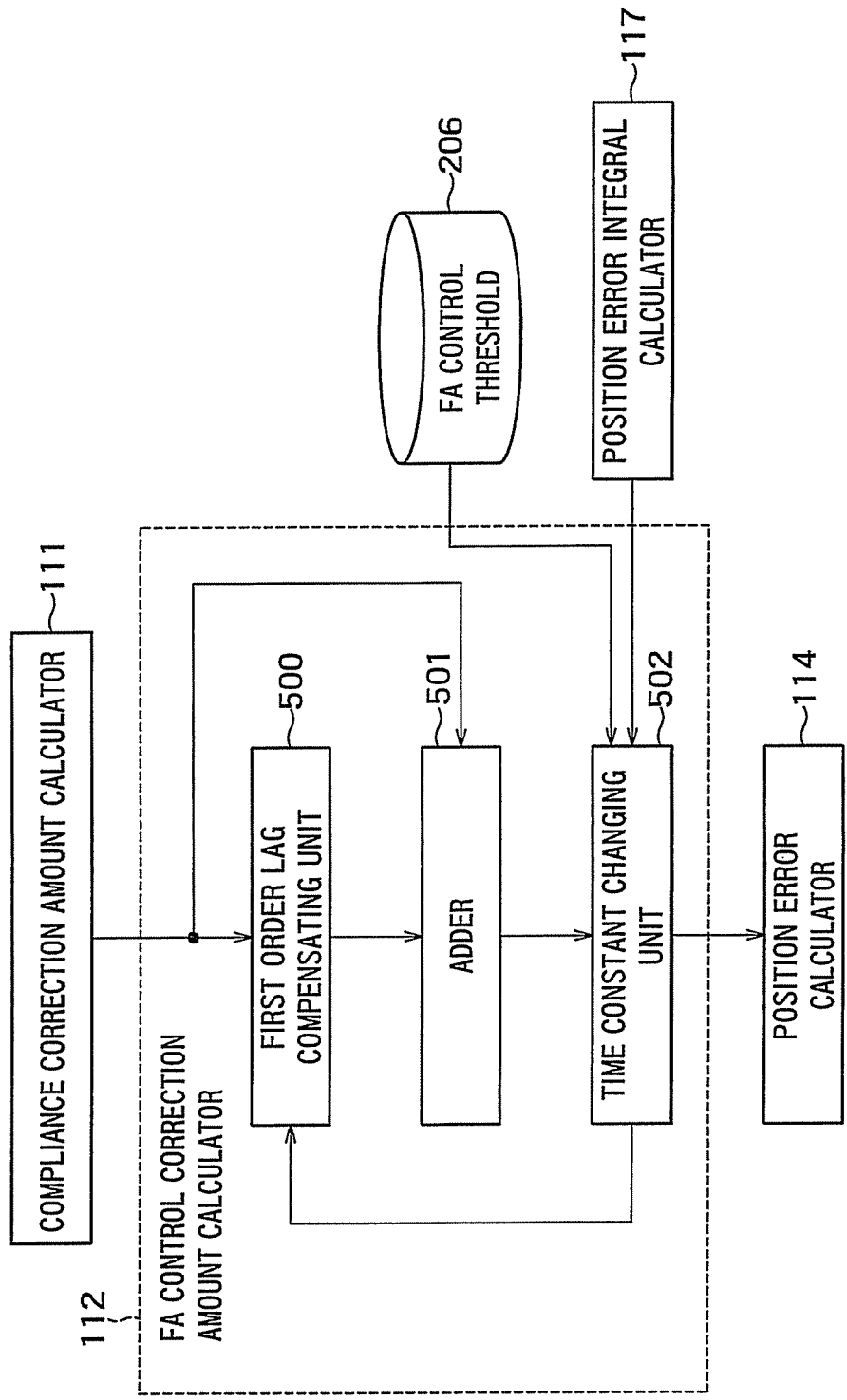
FIG. 5 is a block diagram showing a force-accommodative control correction amount calculator according to the embodiment.

FIG. 5 shows an example of a configuration of the force-accommodative control correction amount calculator 112.

The force-accommodative control correction amount calculator 112 includes a first order lag compensating unit 500, an adder 501 and a time constant changing unit 502.

The first order lag compensating unit 500 applies the first order lag compensation represented by Expression (6) to the compliance correction amount "$\Delta x_{comp}$" (performs a first order lag operation).

$$K_A/(Ts+1) \qquad (6)$$

The adder 501 calculates a force-accommodative control correction amount $\Delta x_{force-comp}$ (second correction amount), as represented by Expression (7), by adding the calculation result "$(K_A/(Ts+1))\Delta x_{comp}$" by the first order lag compensating unit 500 to the compliance correction amount "$\Delta x_{comp}$"

$$\Delta x_{force-comp} = (1 + K_A/(Ts+1))\Delta x_{comp} \qquad (7)$$

The time constant changing unit 502 reads a force-accommodative control threshold "Th1" (first threshold) and a force-accommodative control threshold "Th2" (second threshold) from the force-accommodative control threshold storage 206. The time constant changing unit 502 performs changing operations (a first process and a second process) on the time constant "T" of the first order lag compensation in the first order lag compensating unit 500, using the read force-accommodative control thresholds "Th1" and "Th2", a position error integral (integral of position errors so far) calculated by an after-mentioned position error integral calculator 117 and the correction amount "$\Delta x_{force-comp}$" calculated by the adder 501.

The first process: it is determined whether the force-accommodative control correction amount calculated by the adder 501 is smaller than the threshold "Th1" read from the force-accommodative control threshold storage 206 or not. If the amount is more than or equal to the threshold "Th1", the time constant used in the first order lag compensating unit 500 is corrected. For instance, the time constant is increased by adding a predetermined value "$\Delta T1$" to the present time constant "T". If the correction amount is smaller than the threshold "Th1", no process is performed. This first process prevents the endpoint from coming into contact with the operation target object before reaching the target position and causing an excessive contact force.

The second process: it is determined whether the position error integral value calculated by the after-mentioned position error integral calculator 117 is smaller than the threshold "Th2" read from the force-accommodative control threshold storage 206 or not. If the position error integral value is more than or equal to "Th2", the time constant "T" of the first order lag compensation used in the first order lag compensating unit 500 is corrected. For instance, the time constant is increased by adding the predetermined value "$\Delta T2$" to the time constant "T" which is the value after the first process. This second process prevents the endpoint from continuously moving owing to no generated contact force in a case where the endpoint is not contact at an assumed position.

After the time constant changing unit 502 performs the changing operation (the first process and the second process), this unit feeds the time constant "T" back to the first order lag compensating unit 500. The time constant changing unit 502 outputs the correction amount $\Delta x_{force-comp}$ calculated by the adder 501 to the position error calculator 114. The first order lag compensating unit 500, having received the feedback, uses the feedback time constant.

The position commanded value generator 113 reads target endpoint position data stored in the position data storage 200. The position commanded value generator 113 calculates an interpolated endpoint position commanded value "$x_R$" for each control period, from the target endpoint position data.

The position error calculator 114 performs calculation of Expression (8) from the endpoint position commanded value "$x_R$" generated by the position commanded value generator 113, the present endpoint position "x" calculated by the endpoint position calculator 104, and the correction amount "$\Delta x_{force\text{-}comp}$" calculated by the force-accommodative control correction amount calculator 112. According to the calculation of Expression (8), the position error "$\Delta x$" in consideration of the correction amount "$\Delta x_{force\text{-}comp}$" is calculated. The position error calculator 114 stores the calculated position error "$\Delta x$" in the position error storage 207, and outputs this error to the joint angle difference calculator 115.

$$\Delta x = x_R - x + x_{force\text{-}comp} \quad (8)$$

The position error integral calculator 117 reads the position errors at the previous (or last) control period and the current control period from the position error storage 207. The position error integral calculator 117 calculates the position error integral value by integrating the position errors.

The joint angle difference calculator 115 calculates the joint angle difference "$\Delta\theta$" from the error "$\Delta x$" calculated by the position error calculator 114, using the inverse matrix of the Jacobian matrix "J", as represented by Expression (9).

$$\Delta\theta = J^{-1}\Delta \quad (9)$$

The torque commanded value calculator 116 generates a torque commanded value (control target value) by integrating the joint angle difference calculated by the joint angle difference calculator 115.

The driver 101 drives the actuator 100 responsive to the torque commanded value calculated by the torque commanded value calculator 116.

For instance, a semiconductor memory, a magnetic disk, an optical disk, a magneto-optical disk, a magnetic tape or the like can be adopted as the position data storage 200, the link parameter storage 201, the friction coefficient storage 202, the Jacobian matrix storage 203, the force-moment data storage 204, the compliance model storage 205, the force-accommodative control threshold storage 206 and the position error storage 207.

The position data storage 200 stores a target endpoint position data string used by the position commanded value generator 113 for generating the endpoint position commanded value. The link parameter storage 201 stores the link parameters related to the links 301 and 302 of the robot. The friction coefficient storage 202 stores friction coefficient data, which has preliminarily been acquired from a velocity-torque relationship at a constant speed operation and is used by the friction force torque calculator 401 for calculating the friction force torque. The Jacobian matrix storage 203 stores the Jacobian matrix calculated by the Jacobian matrix calculator 105. The force-moment data storage 204 stores target endpoint force data string used by the force commanded value generator 109 for generating the endpoint position force commanded value. The compliance model storage 205 stores the compliance model given in advance. The force-accommodative control threshold storage 206 stores the thresholds "Th1" and "Th2", which are for the force-accommodative control correction amount and used in the force-accommodative control correction amount calculator 112. The position error storage 207 stores the position error calculated by the position error calculator 114.

<Robot Control Method>

Figure 6:
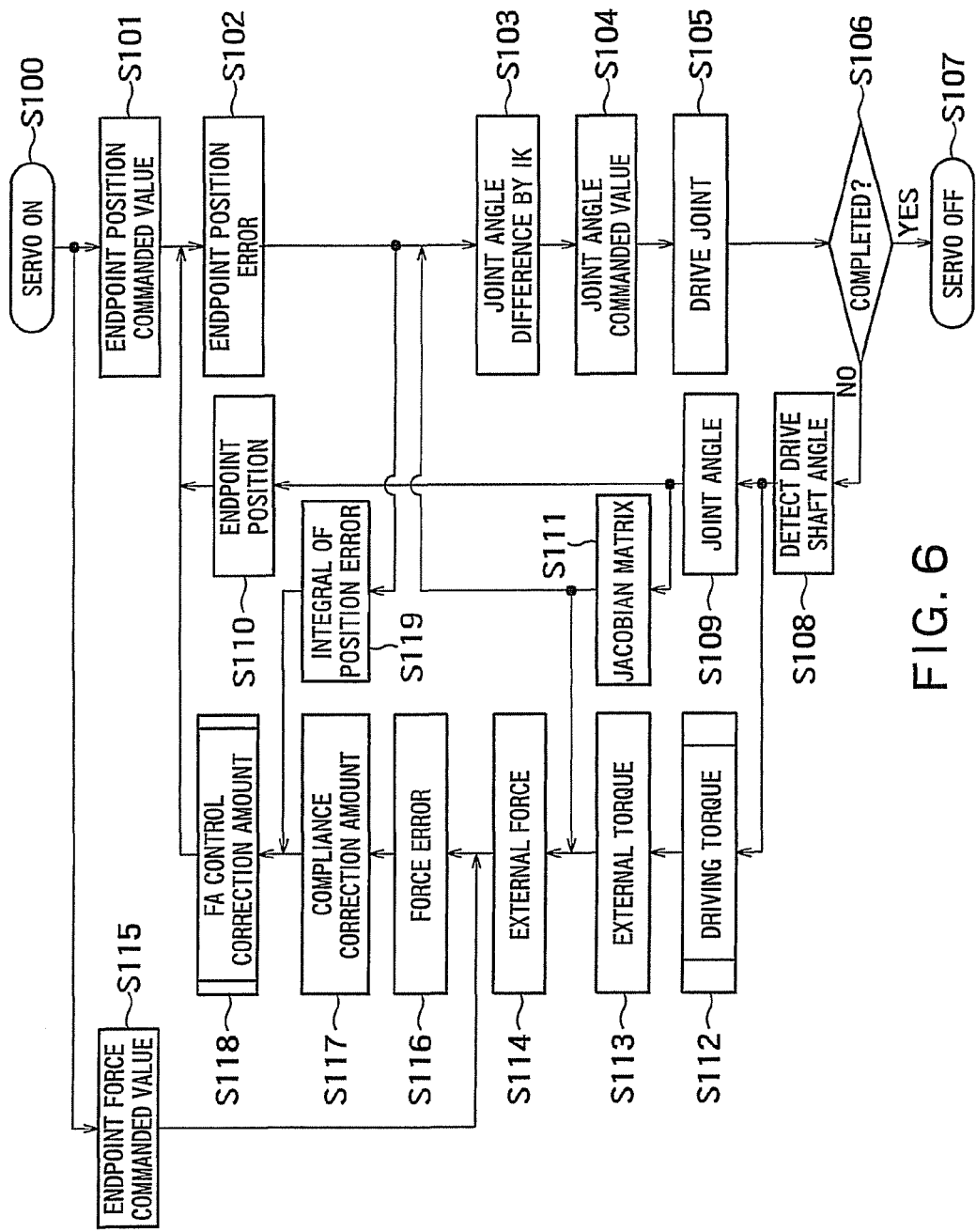
FIG. 6 shows a robot control method according to the embodiment.

FIG. 6 is a flowchart for illustrating a robot control method according to the embodiment.

(A) In step S100, control operation is started. In step S101, the position commanded value generator 113 reads the target endpoint position data string from the position data storage 200. The position commanded value generator 113 generates the endpoint position commanded value for each control period on the basis of the target endpoint position data string. In step S102, the position error calculator 114 calculates the error between the endpoint position commanded value generated by the position commanded value generator 111 and the endpoint position calculated by the endpoint position calculator 104 in which the correction amount (force-accommodative control correction amount $\Delta x_{force\text{-}comp}$) of the endpoint position is considered. In step S103, the joint angle difference calculator 115 calculates the joint angle difference by performing the inverse kinematics (IK) calculation, as represented in Expression (9), on the error calculated by the position error calculator 114, using the Jacobian matrix read from the Jacobian matrix storage. In step S104, the torque commanded value calculator 116 calculates the torque commanded value by integrating the joint angle difference calculated by the joint angle difference calculator 115. In step S105, the driver 101 drives the actuator 100, using the torque commanded value calculated by the torque commanded value calculator 116, as the control target value. More specifically, the endpoint position is controlled by driving the drive shaft 306. In step S106, completion of the control operation is confirmed and, in step S107, the processing is finished. In step S106, if the control operation is not completed, the processing proceeds to step S108.

(B) In step S108, the drive shaft angle detector 102 detects the drive shaft angle. In step S109, the joint shaft angle calculator 103 calculates the joint shaft angle from the drive shaft angle calculated by the drive shaft angle detector 102, on the basis of the reduction ratio of the speed reducer and the like. In step S110, the endpoint position calculator 104 reads the link parameters from the link parameter storage 201. The endpoint position calculator 104 calculates the endpoint position, using the link parameters, from the joint shaft angle calculated by the joint shaft angle calculator 103, according to the forward kinematics calculation. In step S111, the Jacobian matrix calculator 105 calculates the Jacobian matrix from the joint shaft angle calculated by the joint shaft angle calculator 103.

(C) In step S112, the driving torque estimator 106 estimates the driving torque from the drive shaft angle calculated by the drive shaft angle detector 102 and the joint shaft angle calculated by the joint shaft angle calculator 103. In step S113, the external torque calculator 107 calculates the external torque from the difference between the driving torque estimated by the driving torque estimator 106 and the actual torque commanded value calculated by the torque commanded value calculator 116. In step S114, the external force calculator 108 calculates the external force from the external torque calculated by the external torque calculator 107, using the Jacobian matrix calculated by the Jacobian matrix calculator 105, as represented by Expression (2).

(D) In step S115, the force commanded value generator 109 reads the target endpoint force-moment data string from the force-moment data storage 204. The force commanded value generator 109 generates the endpoint force commanded value for each control period on the basis of the target endpoint force-moment data string. In step S116, the force error calculator 110 calculates the force error, which is the error between the endpoint force commanded value generated by the force commanded value generator 109 and the endpoint external force calculated by the external force calculator 108. In step S117, the compliance correction amount calculator 111 reads the compliance model from the compliance model storage 205. The compliance correction amount calculator 111 calculates the correction amount for the endpoint position according to the force error calculated by the force error calculator 110, using the compliance model, as represented by the Expression (4). In step S118, the force-accommodative (FA) control correction amount calculator 112 applies the first order lag compensation to the compliance correction amount generated by the compliance correction amount calculator 111, as represented by Expression (7). The force-accommodative control correction amount calculator 112 calculates the force-accommodative control correction amount for the endpoint position. The processing returns to step S102; the position error calculator 114 calculates, as represented by Expression (8), the error between the endpoint position commanded value calculated by the position commanded value generator 111 and the endpoint position calculated by the endpoint position calculator 104 in which the correction amount calculated by the force-accommodative control correction amount calculator 112 is considered.

<Driving Torque Estimating Process>

Figure 7:
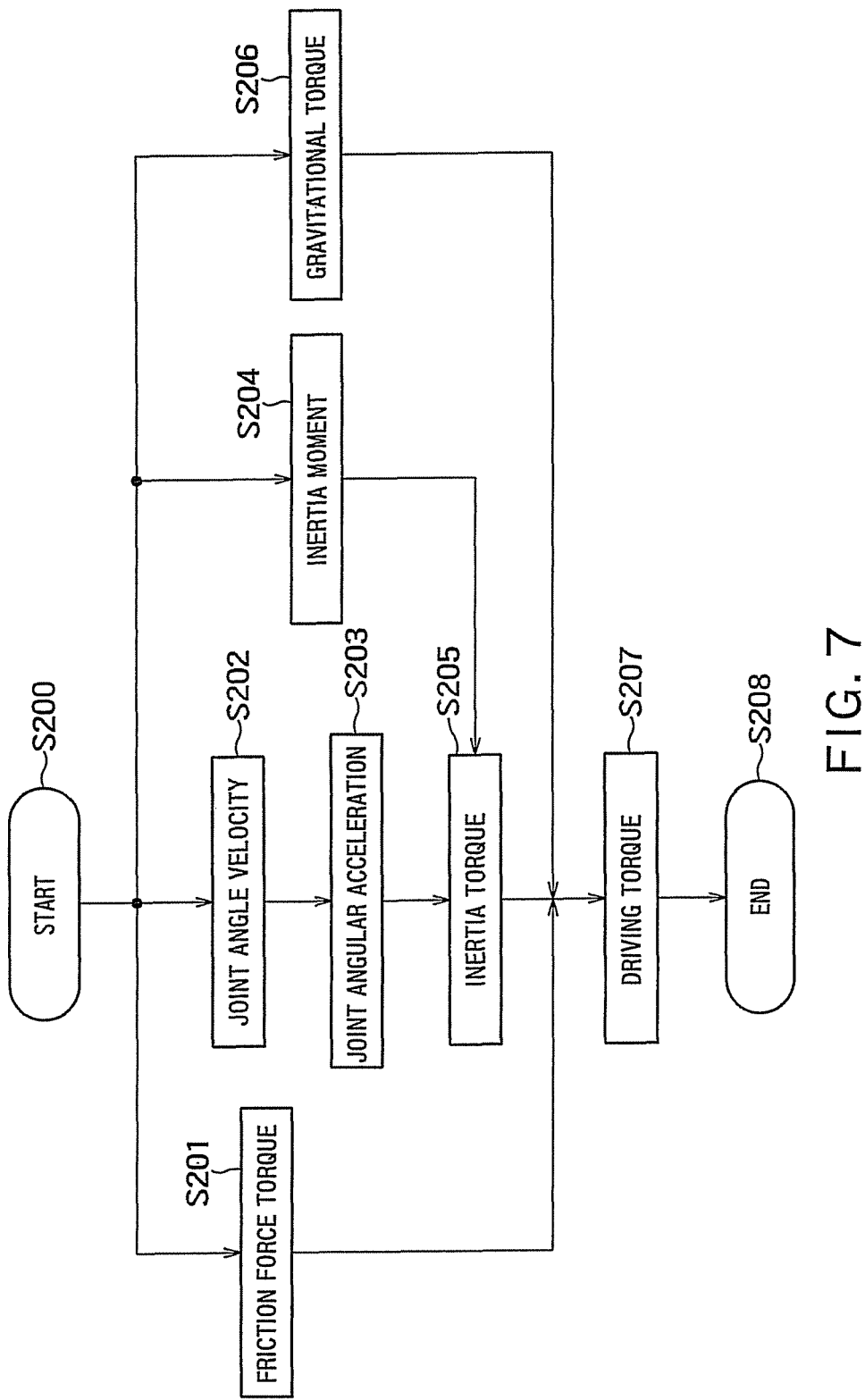
FIG. 7 shows a driving torque estimating process according to the embodiment.

FIG. 7 is a flowchart for illustrating the driving torque estimating process of step S112 shown in FIG. 6.

(A) In step S200, the driving torque estimating process is started. In step S201, the drive shaft velocity calculator 400 calculates a temporal difference (or temporal subtraction) on the basis of the drive shaft angle detected by the drive shaft angle detector 102. The drive shaft velocity calculator 400 calculates the drive shaft velocity based on the temporal difference. The friction force torque calculator 401 reads the friction coefficient from the friction coefficient storage 202. The friction force torque calculator 401 calculates the friction force torque from the friction coefficient and the drive shaft velocity calculated by the drive shaft velocity calculator 400.

(B) In step S202, the velocity calculating unit 410 calculates the temporal difference of the joint shaft angles calculated by the joint shaft angle calculator 103. The velocity calculating unit 410 calculates the joint angle velocity based on the temporal difference. In step S203, the acceleration calculating unit 411 calculates the temporal difference of the joint angle velocities from the velocity calculating unit 410. The acceleration calculating unit 411 calculates the joint angular acceleration based on the temporal difference. In step S204, the inertia moment calculating unit 412 reads the link parameters from the link parameter storage 201. The inertia moment calculating unit 412 calculates inertia moments for the respective joints from the joint shaft angle calculated by the joint shaft angle calculator 103 and the link parameters. In step S205, the inertia torque calculating unit 413 calculates the inertia torque, from the joint angular acceleration calculated by the acceleration calculating unit 411 and the inertia moment calculated by the inertia moment calculating unit 412.

(C) In step S206, the gravitational torque calculator 403 reads the link parameters from the link parameter storage 201. The gravitational torque calculator 403 calculates the gravitational forces applied to the links 301 and 302, from the joint shaft angle calculated by the joint shaft angle calculator 103 and the link parameters. The gravitational torque calculator 403 calculates the gravitational torque for compensating the gravitational forces applied to the links 301 and 302.

(D) In step S207, the adder 404 adds the friction force torque calculated by the friction force torque calculator 401, the inertia torque calculated by the inertia torque calculating unit 413, and the gravitational torque calculated by the gravitational torque calculator 403 to one another. The adder 404 estimates the driving torque by adding the friction force torque, the inertia torque and the gravitational torque to one another. In step S208, the driving torque estimating process is finished.

<Force-Accommodative Control Correction Amount Calculating Process>

Figure 8:
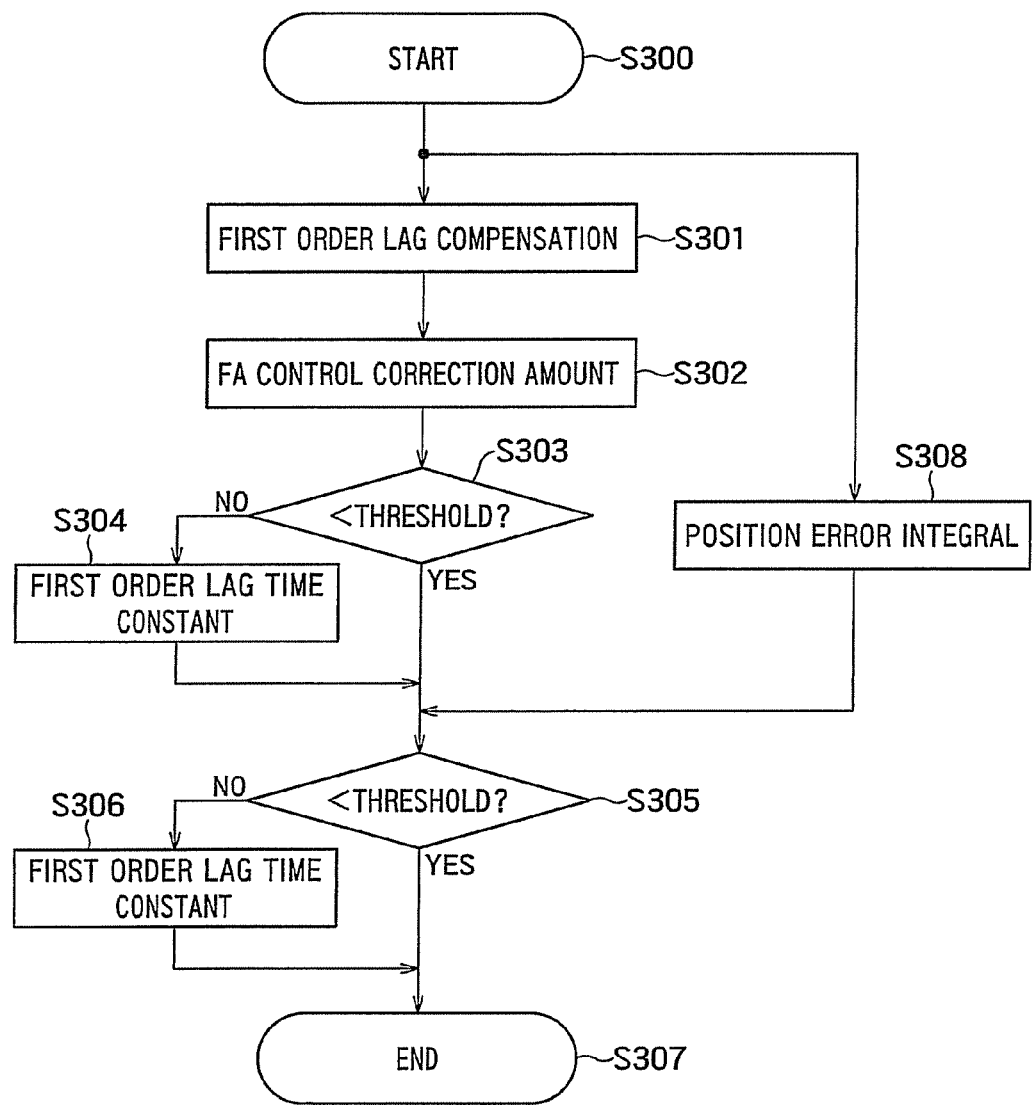
FIG. 8 shows a force-accommodative control correction amount calculating process according to the embodiment.

FIG. 8 is a flowchart for illustrating the force-accommodative control correction amount calculating process of step S118 shown in FIG. 6.

(A) In step S300, the force-accommodative control correction amount calculating process is started. In step S301, the first order lag compensating unit 500 applies the first order lag compensation to the compliance correction amount, as represented by Expression (6). In step S302, the adder 501 calculates the force-accommodative control correction amount "$\Delta x_{force\text{-}comp}$", by adding the first order lag compensation for the compliance correction amount to the compliance correction amount, as represented by Expression (7).

(B) In step S303, it is determined whether or not the force-accommodative control correction amount $\Delta x_{force\text{-}comp}$" calculated by the adder 501 is smaller than the threshold Th1 read from the force-accommodative control threshold storage 206. If the correction amount is smaller than the threshold "Th1", the processing proceeds to S305. If the correction amount is more than or equal to the threshold "Th1", the processing proceeds to step S304. In step S304, the time constant of the first order lag compensation, which is used in the first order lag compensating unit 500, is corrected. For instance, the time constant is increased, for instance, by adding the predetermined value "$\Delta T1$" to the present time constant "T".

(C) Meanwhile, in step S308, the position error integral calculator 117 calculates the position error integral, from the position error read from the position error storage 207. In step S305, it is determined whether the position error integral value is smaller than the threshold "Th2" read from the force-accommodative control threshold storage 206 or not. If the position error integral value is smaller than the threshold "Th2", the processing proceeds to S307 and the force-accommodative control correction amount calculating process is finished. If this value is more than or equal to the threshold Th2, the processing proceeds to step S306 and then the time constant of the first order lag compensation, which is used in the first order lag compensating unit 500, is corrected. The time constant is increased, for instance, by adding the predetermined value "$\Delta T2$" to the time constant "T" which is the value after the processes of steps S303 and S304. Subsequently, in step S307, the force-accommodative control correction amount calculating process is finished.

The time constant changing operation of (B) and (C) may be performed at every predetermined update period.

As described above, to the embodiment follows the target contact force at the endpoint of the robot at high speed, and quickly detects errors, such as a contact failure and an excessive contact force, thereby allowing stable force control to be realized.

The series of procedures shown in FIGS. 6 to 8 can be performed by controlling the robot controlling device shown in FIG. 1 according to a program including algorithms equivalent to those of FIGS. 6 to 8. For instance, these procedures include: the step in which the drive shaft angle detector 102 detects the drive shaft angle; the step in which the joint shaft angle calculator 103 calculates the joint shaft angle from the drive shaft angle; the step in which the endpoint position calculator 104 calculates the endpoint position of the robot from the angle of the joint shaft; the step in which the position commanded value generator 113 generates the position commanded value for the endpoint position; the step in which the position error calculator 114 calculates the error between the endpoint position and the position commanded value; the step in which the joint angle difference calculator 115 calculates the joint angle difference, from the error, according to the inverse kinematics calculation; the step in which the torque commanded value calculator 116 calculates the torque commanded value by integrating the joint angle difference; the step in which the driver 101 drives the actuator 100 on the basis of the torque commanded value; the step in which the driving torque estimator 106 estimates the driving torque for driving the actuator 100, from the drive shaft angle and the joint shaft angle; the step in which the external torque calculator 107 calculates the difference between the estimated driving torque and the torque commanded value as the external torque; the step in which the Jacobian matrix calculator 105 calculates the Jacobian matrix between the operational coordinate system of the robot and the joint coordinate system on the basis of the angle of the joint shaft; the step in which the external force calculator 108 calculates the external force applied to the endpoint position, from the Jacobian matrix and the external torque; the step in which the force commanded value generator 109 generates the force commanded value at the endpoint; the step in which the force error calculator 110 calculates the error between the estimated external force and the force commanded value; the step in which the compliance correction amount calculator 111 calculates the correction amount for the position commanded value, according to the force error, using the compliance model for the endpoint position which is stored in the compliance model storage 205; the step in which the force-accommodative control correction amount calculator 112 calculates the force-accommodative control correction amount, which is the correction amount for the position commanded value, on the basis of the correction amount and the first order lag compensation, while performing the operation of changing the time constant of the first order lag compensation using the threshold stored in the force-accommodative control threshold storage 206 and the position error integral value calculated by the position error integral calculator 117; and the step in which the position error integral calculator 117 integrates the position error, from the position errors having been calculated by the position error calculator 114 and stored in the position error storage 207. The program may be stored in a storage, for instance, such as the position data storage 200. The program is stored in a computer-readable recording medium, and the medium is read by the position data storage 200 or the like, thereby allowing the series of procedures in the embodiment to be performed. The program may be stored in the position data storage 200 or the like via an information processing network, such as the Internet.

First Variation

As a first variation of the embodiment, the external force calculator 108 may acquire the external force by detecting the external force using a force sensor attached to the endpoint. Instead of attachment to the endpoint, in a case where a homogeneous transformation matrix converting a point at which the force sensor is attached into the endpoint is known, the force can be calculated as an equivalent force at the endpoint.

Second Variation

As a second variation of the embodiment, the driving torque estimator 106 may detect the torque by a torque sensor or the like attached to the joint shaft 307, and acquire this torque as the driving torque.

Third Variation

As a third variation of the embodiment, instead of using the Jacobian matrix as represented by Expression (9), a case of using inverse transformation capable of directly calculating the joint angle from the endpoint position is described. In this case, the joint angle difference calculator 115 calculates a new endpoint position "x" by adding the correction amount "$\Delta x_{force\text{-}comp}$" for the endpoint position calculated by the force-accommodative control correction amount calculator 112 to the endpoint position commanded value "$x_R$" generated by the position commanded value generator 113, as represented by Expression (10).

$$x = x_R + \Delta x_{force\text{-}comp} \tag{10}$$

The torque commanded value calculator 116 calculates the torque commanded value "$\theta_R$" by multiplying the inverse transformation "$\Lambda^{-1}$" to the new endpoint position "x", as represented by Expression (11).

$$\theta_R = \Lambda^{-1} x \tag{11}$$

Another Embodiment

The present invention has thus been described according to the embodiment. However, it should not be understood that the description and diagrams forming a part of the disclosure limit the present invention. According to the disclosure, various alternative embodiments, examples and operation techniques become apparent for the person skilled in the art.

Figure 9:
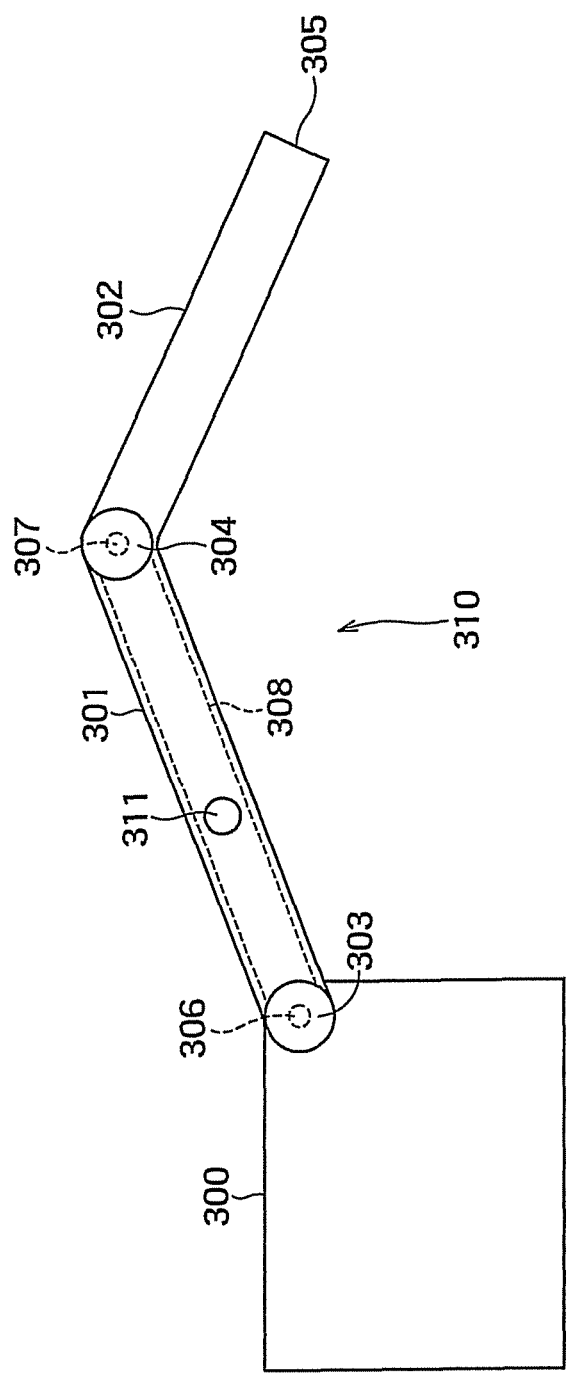
FIG. 9 is a schematic diagram showing a control target according to another embodiment.

For instance, in the embodiment, the calculation of the inertia torque uses the joint angular acceleration, which has been calculated by means of the second-order temporal difference of the joint shaft angle from the velocity calculating unit 410 and the acceleration calculating unit 411. In a certain control period, time lag is increased and the torque error tends to be increased. In this case, as shown in FIG. 9, the acceleration of the link 301 is detected from an acceleration sensor 311 mounted on the link 301. The acceleration calculating unit 411 converts the detected acceleration into the joint angular acceleration. The inertia torque may be calculated on the basis of the converted joint angular acceleration.

As the driving torque estimating process, the example of estimating the driving torque from the friction force torque, the inertia torque and the gravitational torque has been shown. However, the present invention is not limited thereto. For instance, parameters of a centrifugal force, Coriolis force and the like can further be considered.

The CPU 1, the position data storage 200, the link parameter storage 201, the friction coefficient storage 202, the Jacobian matrix storage 203, the force-moment data storage 204, the compliance model storage 205, the force-accommodative control threshold storage 206, the position error storage 207 and the like may be integrated by being embedded in the robot, which is the control target. The CPU 1, the position data storage 200, the link parameter storage 201, the friction coefficient storage 202, the Jacobian matrix storage 203, the force-moment data storage 204, the compliance model storage 205, the force-accommodative control threshold storage 206, the position error storage 207 and the like may be arranged outside the robot, which is the control target, and this robot can be remotely controlled in a wired or wireless manner.

As described above, it is a matter of course that the present invention can include various embodiments which are not described here. Accordingly, the technical scope of the present invention is defined only by items specifying the invention pertaining to claims which are appropriate according to the above description.

The invention claimed is:

1. A robot controlling device, comprising:
an actuator to drive a drive shaft transferring a driving force to a joint shaft;
a drive shaft angle detector to detect an angle of the drive shaft;
a joint shaft angle calculator to calculate an angle of the joint shaft from the angle of the drive shaft;
an endpoint position calculator configured to calculate an endpoint position of a robot from the angle of the joint shaft;
a position commanded value generator configured to generate a position commanded value for the endpoint position;
a position error calculator configured to calculate a position error, which is an error between the endpoint position and the position commanded value;
a Jacobian matrix calculator configured to calculate a Jacobian matrix between an operational coordinate system of the robot and a joint coordinate system, on the basis of the angle of the joint shaft;
a joint angle difference calculator configured to calculate a joint angle difference, from the position error and the Jacobian matrix, according to an inverse kinematics calculation;
a torque commanded value calculator configured to calculate a torque commanded value by integrating the joint angle difference;
a driver to drive the actuator on the basis of the torque commanded value;
an external force calculator configured to calculate an external force applied to the endpoint position;
a force commanded value generator configured to generate a force commanded value for the endpoint position;
a force error calculator configured to calculate a force error which is an error between the external force and the force commanded value;
a compliance model storage to store a compliance model for the endpoint position;
a first correction amount calculator configured to calculate a first correction amount for the position commanded value, according to the force error, using the compliance model; and
a second correction amount calculator configured to calculate a second correction amount for the position commanded value, on the basis of a first order lag compensation for the first correction amount,
wherein the position error calculator calculates the position error using the second correction amount.

2. The device according to claim 1, wherein the second correction amount calculator increases a time constant of the first order lag compensation if an absolute value of the first correction amount is more than or equal to a first threshold.

3. The device according to claim 2, further comprising:
a position error storage to store the position error calculated by the position error calculator; and
a position error integral calculator to integrate the position error stored in the position error storage,
wherein the second correction amount calculator increases a time constant of the first order lag compensation if an integral value of the position error is more than or equal to a second threshold.

4. The device according to claim 3, further comprising
an external torque calculator configured to calculate an external torque applied to the joint shaft,
wherein the external force calculator calculates an external force applied to the endpoint position, on the basis of the Jacobian matrix and the external torque.

5. The device according to claim 4, further comprising:
a driving torque estimator configured to estimate a driving torque for driving the actuator, from the angle of the joint shaft; and
a friction coefficient storage to store a friction coefficient at the endpoint position,
wherein the external torque calculator acquires a difference between the estimated driving torque and the torque commanded value as the external torque,
the driving torque estimator includes:
a drive shaft velocity calculator configured to calculate an angular velocity of the drive shaft from the angle of the drive shaft;
a friction force torque calculator configured to calculate a friction torque from the angular velocity of the drive shaft and the friction coefficient;
a gravitational torque calculator configured to calculate a gravitational torque from the angle of the joint shaft;
an inertia torque calculator configured to calculate an inertia torque from the angle of the joint shaft; and
an adder configured to acquire the driving torque by adding the friction force torque, the gravitational torque and the inertia torque, and
the inertia torque calculator includes:
a velocity calculating unit configured to calculate a joint angle velocity from the angle of the joint shaft;
an acceleration calculating unit configured to calculate a joint angular acceleration from the joint angle velocity;
an inertia moment calculating unit configured to calculate an inertia moment of a link of the robot, from the angle of the joint shaft; and
an inertia torque calculating unit configured to calculate an inertia torque, from the joint angular acceleration and the inertia moment.

* * * * *